United States Patent [19]

Moriki et al.

[11] 4,426,695
[45] Jan. 17, 1984

[54] DISC REPRODUCING APPARATUS

[75] Inventors: Takeo Moriki; Akira Fukumitsu, both of Fukaya, Japan

[73] Assignee: Tokyo Shibaura Denki Kabushiki Kaisha, Kawasaki, Japan

[21] Appl. No.: 376,136

[22] Filed: May 7, 1982

[30] Foreign Application Priority Data

May 9, 1981 [JP] Japan .................................. 56-69830

[51] Int. Cl.³ .......................... G11B 3/36; G11B 17/04
[52] U.S. Cl. .................................... 369/77.2; 369/219; 369/221
[58] Field of Search ...................... 369/75, 77, 79, 215, 369/219, 221

[56] References Cited

U.S. PATENT DOCUMENTS 4,191,381 3/1980 Staue .................................... 369/215
4,351,046 9/1982 Elliott ................................. 369/77.2
4,352,174 9/1982 Tajima et al. ....................... 369/77.2

Primary Examiner—Steven L. Stephan
Attorney, Agent, or Firm—Cushman, Darby & Cushman

[57] ABSTRACT

A disc is inserted into a disc reproducing apparatus by insertion of a casing housing the disc therein and is removed from the apparatus by insertion of an empty casing thereinto. The apparatus comprises a cartridge which has a stylus and a first mechanism for driving the cartridge. The first driving mechanism includes a clutch mechanism which transmits the driving force of a motor to the cartridge when the apparatus is in a reproducing condition, and which does not transmit the driving force to the cartridge to render the cartridge free to move when the apparatus is in a nonreproducing condition, and an engaging mechanism for holding the cartridge at a reproduction start position in the nonreproducing condition.

7 Claims, 25 Drawing Figures

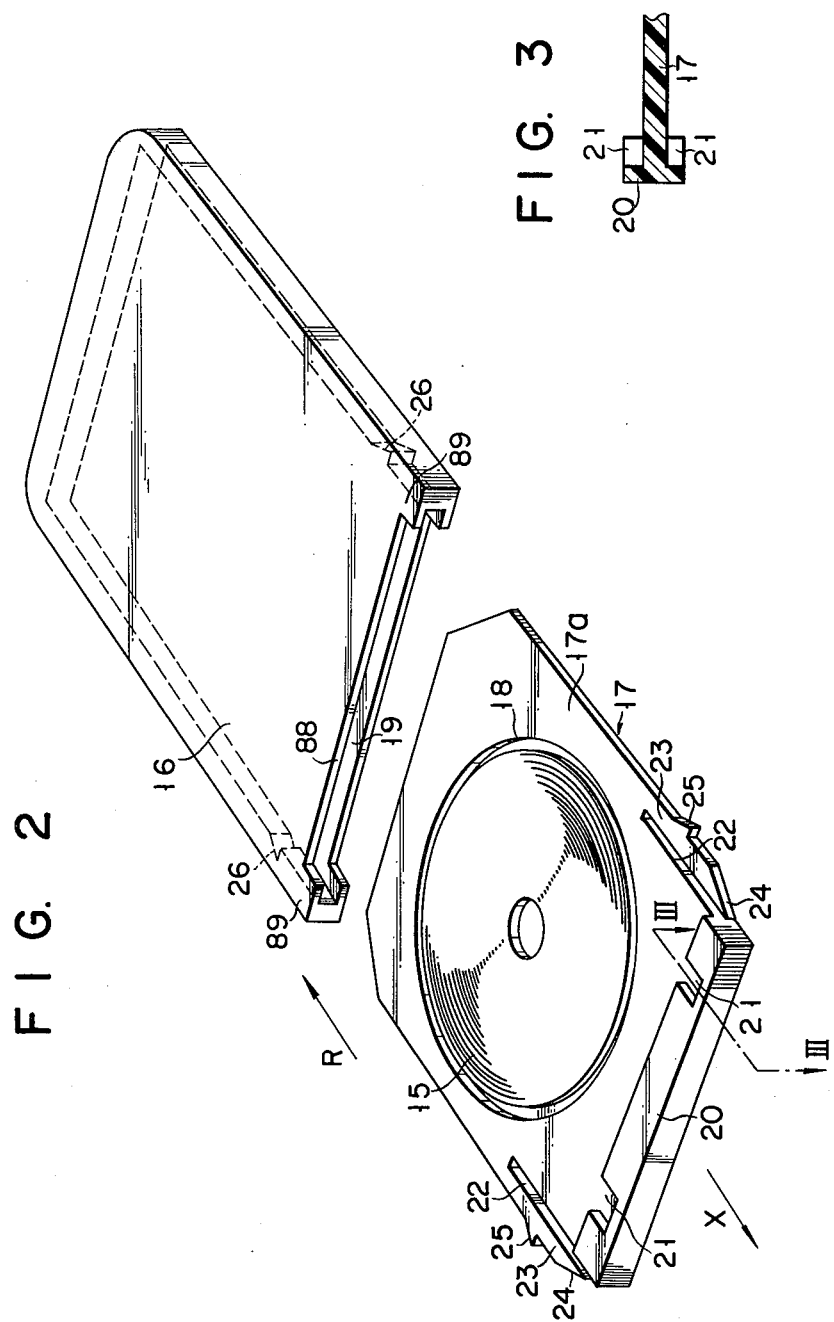

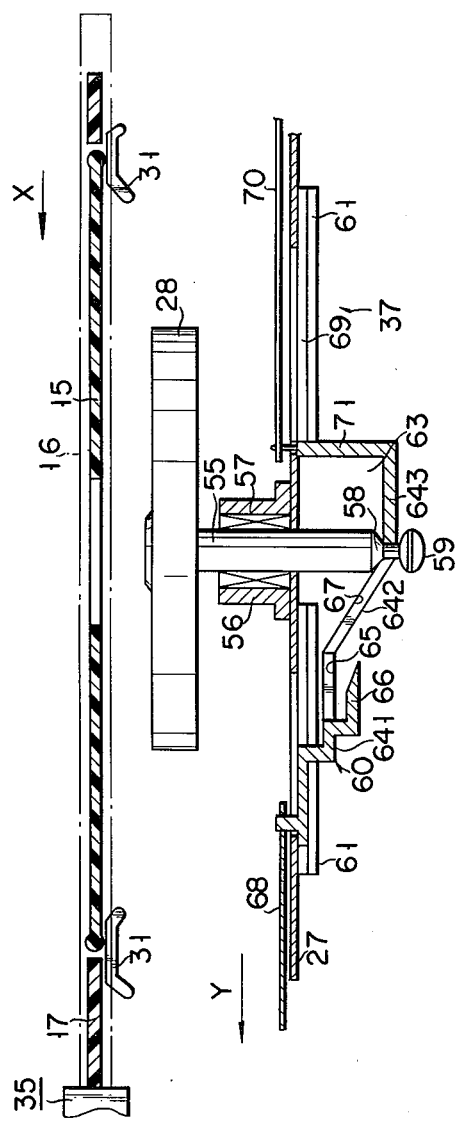
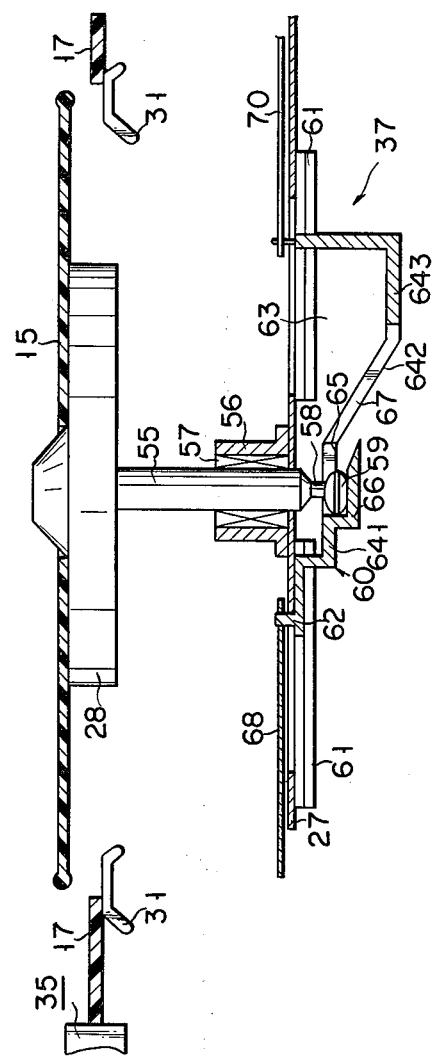

F I G. 17C
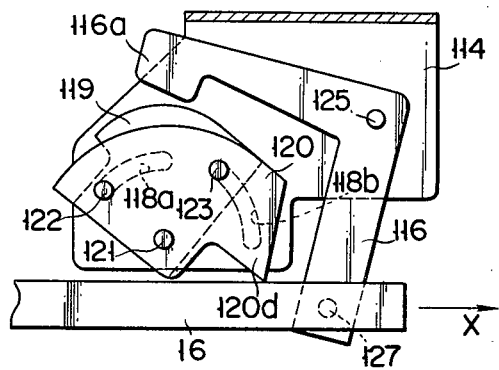
F I G. 17D
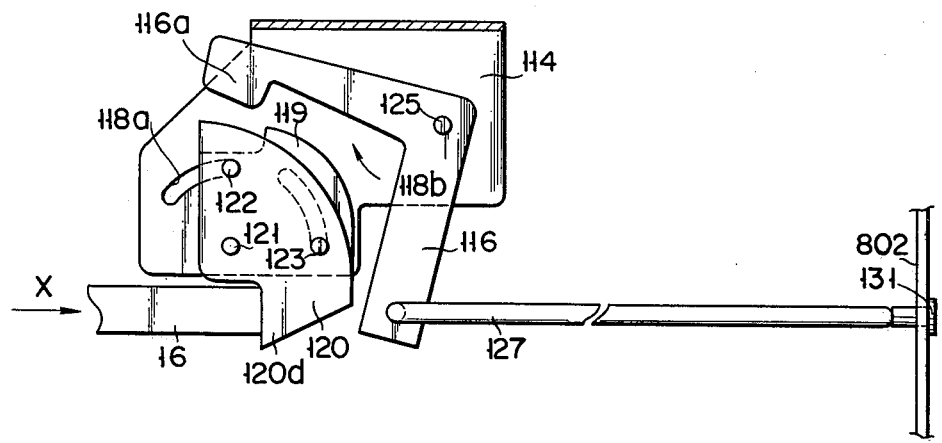

DISC REPRODUCING APPARATUS

BACKGROUND OF THE INVENTION

The present invention relates to a disc reproducing apparatus wherein a disc is inserted into the apparatus by inserting a casing housing the disc therein, and the loaded disc may be removed from the apparatus by inserting the empty casing within the apparatus.

Generally, in a disc reproducing apparatus of this type, a disc, such as a video disc, is placed on a turntable, and information recorded on the video disc is reproduced by bringing a reproducing stylus in contact with the video disc. The information includes video signals and audio signals, and is recorded with very high density according to a PCM (pulse code modulation) recording system. If any foreign matter, such as dust or dirt, sticks to the video disc, therefore, reproduced pictures will be subject to noise. Accordingly, there have been developed various apparatus enabling an operator to set on and remove the video disc from the turntable without directly touching the disc.

Meanwhile, the video disc is housed in a casing opening at one side while it is surrounded by a retaining frame which is locked to the casing. In this state, the video disc is inserted into the reproducing apparatus through one side thereof. When the insertion is completed, the video disc, together with the retaining frame, is held within the reproducing apparatus, and the retaining frame is unlocked from the casing. When the casing is drawn out of the reproducing apparatus, both the video disc and the retaining frame are removed from the casing through one side thereof and are stayed in the reproducing apparatus, so that the casing is emptied. In this state, reproducing operation is started. If the empty casing is inserted into the reproducing apparatus through the one side thereof after the reproducing operation is ended, the video disc, together with the retaining frame, is put into the casing through the one side thereof, and the retaining frame is locked to the casing. Then, if the casing is drawn out of the reproducing apparatus, the video disc and the retaining frame are taken out of the apparatus while they are contained in the casing.

In a disc reproducing apparatus of this type, the cartridge is generally forwarded from the start position in accordance with the rotation of the disc by the driving force of a motor and it is backwarded to the start position by the driving force. The backward movement of the cartridge with this method is time-consuming and immediate reproduction of the next disc or the opposite surface of the same disc may not be prevented until the cartrige returns to the start position. Immediate reproduction from another disc or the other surface of the same disc may be realized by incorporating two motors each for driving the cartridge in the forward and backward directions independently of each other. This may alternatively be performed by the use of a reversible motor and a reduction gear mechanism for changing the transmission ratio according to the direction of rotation of the reversible motor. With this arrangements, according to the direction of rotation of the reversible motor, the speeds of the cartridge in the forward and backward directions are made different from each other. However, these arrangements result in a complex configuration and high cost of the overall apparatus. Moreover, troubles occur more frequently.

Even if the cartridge can be returned to the start position at high speed by the motor, the cartridge bounces at the start position upon such high-speed movement. This results in deviation of the cartridge position from the start position. This deviation causes damage to the stylus or a tracking error. For this reason, a holding means for holding the cartridge upon its return movement must be incorporated. The holding means may securely hold the cartridge in position. However, the holding force of the holding means acts as a load on the motor. Thus, a high-output motor must be used.

SUMMARY OF THE INVENTION

The present invention has been made in consideration of above-mentioned sircumstances and is intended to provide a disc reproducing apparatus which allows free return movement of the cartridge during nonreproducing condition, which securely holds the cartridge upon its return to the start position, thereby preventing the rebound of the cartridge, and which releases the holding force of the cartridge to the start position for reproduction.

According to an aspect of the present invention, there is provided a disc reproducing apparatus in which a disc is inserted by insertion of a casing housing the disc therein and from which the disc is removed by insertion of an empty casing thereinto, the reproducing apparatus comprising a turntable which is vertically movable, a first driving mechanism for moving the turntable to an upper position in a reproducing condition and for moving the turntable to a lower position in a nonreproducing condition, a cartridge which has a stylus for picking up signals recorded on the disc in the reproducing condition and which is movable between a reproduction start position and a reproduction end position, a third driving mechanism, with a motor, for driving the cartridge by driving force of the motor, and an engaging mechanism for hodling the cartridge at the start position in the nonreproducing condition, wherein the first driving mechanism includes a clutch mechanism which transmits the driving force of the motor to cartridge when the turntable is located at the upper position, and which does not transmit the driving force of the motor to the cartridge to render the cartridge free to move when the turntable is positioned at the lower position, the cartridge is restored to the start position through engagement of the empty casing with the cartridge upon insertion of the empty casing, and the engaging mechanism engages with the cartridge at the start position to securely hold the cartridge in position when the turntable is located at the lower position and which does not engage with the cartridge to render the cartridge to be released from the condition where the cartridge is held in its position when the turntable is located at the upper position.

BRIEF DESCRIPTION OF THE DRAWINGS

FIG. 2 is a perspective view showing the video disc together with a casing and a retaining frame;

FIG. 3 is a sectional view of the retaining frame shown in FIG. 2 taken along the line III—III;

FIG. 6 is a side sectional view showing a first drive mechanism in the nonreproducing condition;

FIG. 7 is a side sectional view showing the first drive mechanism in the reproducing condition;

FIGS. 17A to 17D are side views for explaining the mode of operation of the pawl mechanism.

DETAILED DESCRIPTION OF THE PREFERRED EMBODIMENT

There will now be described in detail one embodiment of a disc reproducing apparatus according to the present invention with reference to the accompanying drawings.

Figure 1:
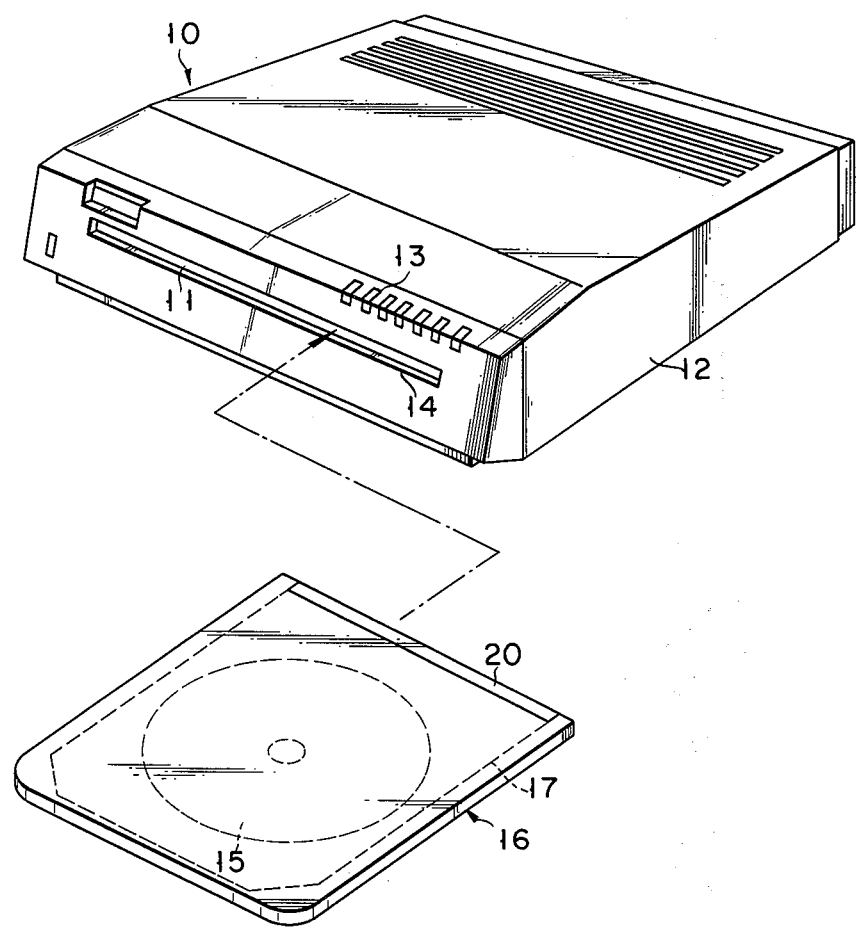
FIG. 1 is a perspective view showing one embodiment of a disc reproducing apparatus according to the present invention together with a video disc.

In this embodiment, as shown in FIG. 1, the disc reproducing apparatus is a video disc player 10 provided with a housing 12. Arranged on the top surface of the housing 12 are plurality of operating buttons 13 for designating various operation modes. On the front side face of the housing 12 opens a horizontally extending insertion inlet 14 in which a casing 16 is inserted. The housing 12 is provided with a cover 11 operably closing the insertion slot 14. The housing 12 contains therein a reproducing mechanism (not shown) for reproducing information recorded on a video disc 15.

In a non-reproduction mode, the video disc 15, along with a retaining frame 17, is contained in the casing 16. In this mode, therefore, the video disc 15 is not exposed to the outside, and hence is kept from being soiled by direct touch of fingers.

As shown in FIG. 2, the video disc 15 is disposed in a through hole 18 which is a size larger than the video disc 15 and is formed in the central portion of the retaining frame 17. Thus, the video disc 15 is allowed to move in one with the retaining frame 17 as the retaining frame 17 moves in the horizontal direction, and to move freely in the vertical direction independently of the retaining frame 17. The casing 16 is in the form of a thin box having an opening 19 in one side face through which the video disc 15 is inserted together with the retaining frame 17 in a direction shown by an arrow R, and defining therein a space to contain the video disc 15 with the retaining frame 17.

The retaining frame 17 includes a frame body 17a which is little thicker than the video disc 15 and a little thinner than the height of the opening 19 of the casing 16, and which has the through hole 18 in the center thereof, and a bank portion 20 formed on that side of the frame body 17a which extends at right angles to the inserting direction R and having a thickness substantially equal to the height of the casing 16. Recesses 21 are formed severally at both end portions of the bank portion 20. The bottom of each recess 21 is flush with the top surface of the frame body 17a. As shown in FIG. 3, the recesses 21 are formed on both top and bottom sides of the bank portion 20. Formed on both sides of the frame body 17a of the retaining frame 17 along the inserting direction R are slits 22 each extending over a given length from one end along the inserting direction R. The pair of slits 22 define a pair of elastic strips 23 extending along the inserting direction R on both sides of the frame body 17a. An outwardly projecting claw 25 is formed in the middle of each elastic strip 23. The claw 25 is composed of a stop surface at right angles to the inserting direction R and a pressing surface inclined inwardly in the inserting direction R. The outer side face of the tip end portion of each elastic strip 23 is composed of a slant face 24 inclined inwardly in the opposite direction to the inserting direction R.

Stop notches 26 capable of receiving their corresponding claws 25 of the retaining frame 17 are formed on those portions of the inner side faces of the casing 16 defining the inside space thereof which face the claws 25 with the retaining frame 17 entirely housed in the casing 16. While the video disc 15 is surrounded by the retaining frame 17, both these members are inserted through the opening 19 into the casing 16 with the other end portion of the retaining frame 17 forward. When both claws 25 abut against the edges of the opening 19 of the casing 16 in the middle of the insertion, both elastic strips 23 are pushed inward through the engagement between the pressing surfaces of the claws 25 and the edges, and the retaining frame 17, accompanied with the video disc 15, is inserted deep into the casing 16. When the retaining frame 17 is entirely swallowed up by the casing 16, both claws 25 are urged to get into their corresponding stop notches 26 of the casing 16 by the elasticity of the elastic strips 23, thereby locking the retaining frame 17 to the casing 16. In such a locked state, the bank portion 20 completely blocks up the opening 19 of the casing 16, thus keeping dust from penetrating into the casing 16 to soil the video disc 15. Since the retaining frame 17 is locked to the casing 16 through the engagement between the claws 25 and the stop notches 26, you will never be able to pull out the video disc 15 from the casing 16 with your hand on the bank portion 20.

Figure 4:
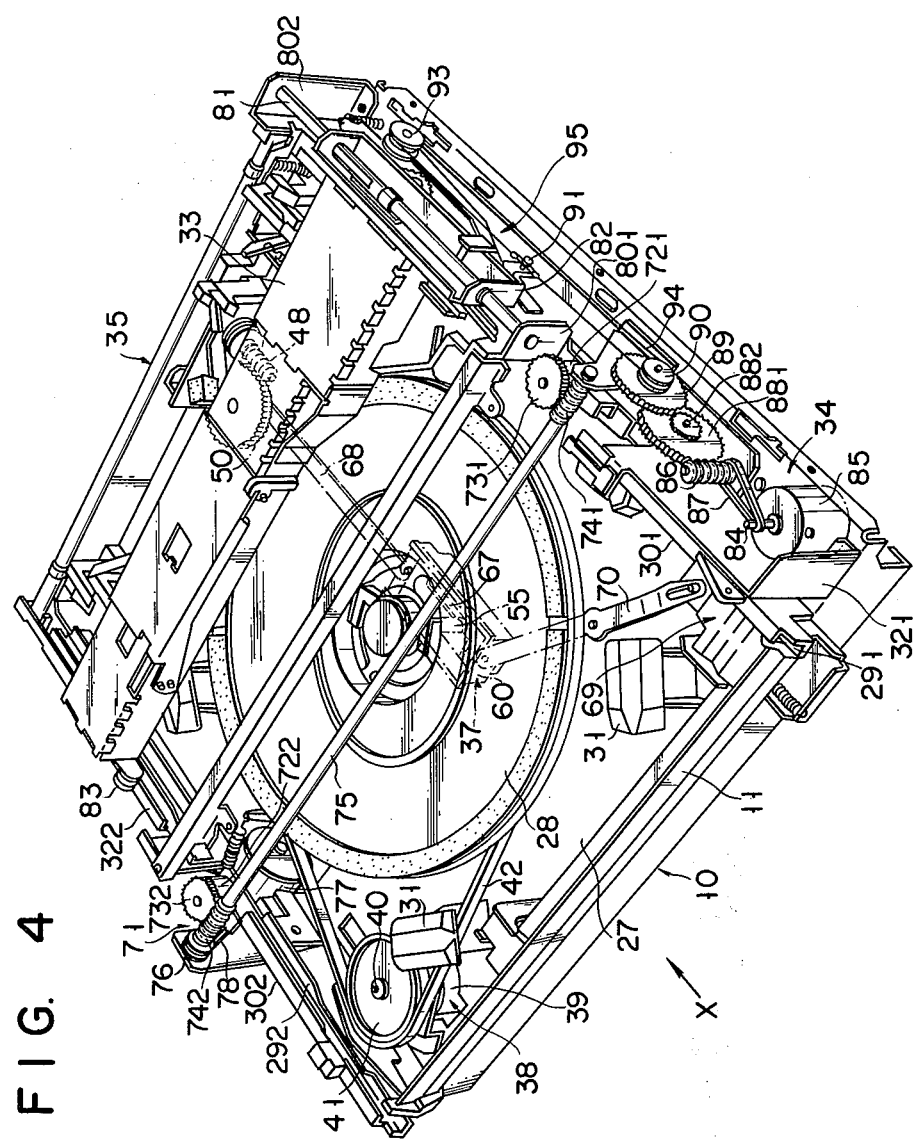
FIG. 4 is a perspective view showing the internal mechanism of the disc reproducing apparatus.

Referring now to FIG. 4, there will be described a guide mechanism for the casing 16 inside the player 10.

As shown in FIG. 4, a horizontally extending chassis 27 is disposed in the housing 12 of the player 10. A turntable 28 with a diameter smaller than that of the video disc 15 is mounted on the chassis 27 so as to be able to be moved vertically by a first driving mechanism 37 (described later) and rotated by a second driving mechanism 38 (described later). A pair of guide rails 301 and 302 are fixed on the chassis 27, extending parallel to an inserting direction indicated by an arrow X (opposite to the aforesaid inserting direction R) and facing each other with the turntable 28 between them. One end of each of the guide rails 301 and 302 is located at each corresponding end portion of the inserting slot 14 shown in FIG. 1. The guide rails 301 and 302 are each provided with groove portions 291 and 292, respectively, to receive their corresponding side portions of the casing 16, the groove portions being a given distance above the top surface of the chassis 27. The guide rails 301 and 302 are long enough to allow the retaining frame 17 to be entirely swallowed up by the housing 12.

The guide rails 301 and 302 are attached to the chassis 27 by means of a pair of auxiliary chassis 321 and 322, respectively. A cartridge 33 is stretched between the two auxiliary chassis 321 and 322, extending at right angles to the direction of the arrow X. The cartridge 33 is allowed to move along the direction of the arrow X, described in detail later. One auxiliary chassis 322 is fitted with a third driving mechanism 34 (described later) for driving the cartridge 33. The cartridge 33 is fitted with a reproducing stylus (not shown), which contacts a groove on the video disc 15 set on the turntable 28 to pick up audio/video signals recorded on the video disc 15.

Four support members 31 are arranged on the region of the chassis 27 around the turntable 28. These support members 31 support the peripheral edge portion of the hole 18 in the frame body 17a of the retaining frame 17 and the outer peripheral portion of the video disc 15 while the video disc 15 is entirely contained in the housing 12. In the non-operating state, the top surface of the turntable 28 is located below the top surfaces of the support members 31. The top surfaces of the support members 31 are substantially flush with the under surfaces of the groove portions 291 and 292 of the guide rails 301 and 302.

Disposed on that portion of the chassis 27 which faces the other end portions of the guide rails 301 and 302 is a holding device 35 to hold the bank portion 20 of the retaining frame 17 as required. The holding device 35 so functions as to unlock the retaining frame 17 from the casing 16 and hold the same when the casing 16, containing therein the video disc 15 surrounded by the retaining frame 17, is inserted in the housing 12, and to release the hold of the retaining frame 17 and lock the same to the casing 16 when the empty casing 16 is inserted in the housing 12 containing the video disc 15 therein after the reproducing operation is ended.

Figure 5A:
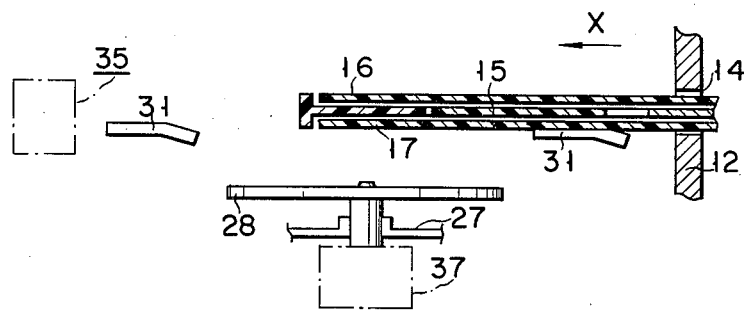
FIGS. 5A to 5C are side sectional views schematically showing the operation modes of a turntable.
Figure 5B:
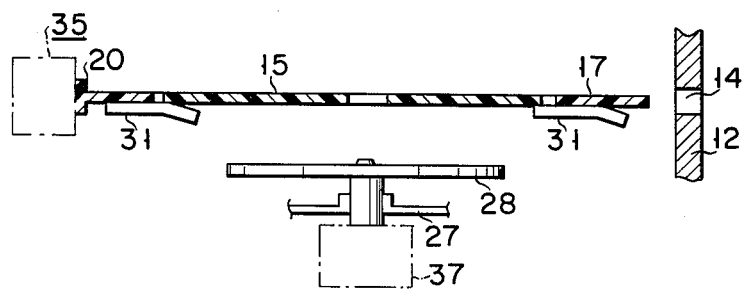
Figure 5C:
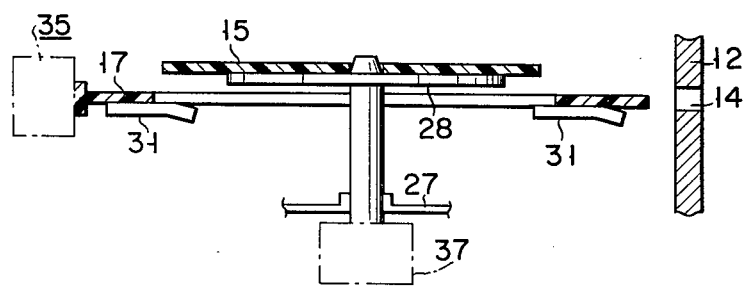

Referring now to FIGS. 5A to 5C, there will be described the way of inserting the video disc 15.

First, the video disc 15, along with the retaining frame 17, is set in the casing 16, and the casing 16 is inserted through the insertion slot 14 into the housing 12 with its one end portion forward while the retaining frame 17 is locked to the casing 16. Both side portions of the casing 16 are regulated and guided in inward movement by the respective groove portions 291 and 292 of the guide rails 301 and 302. At this time, the under surface of the casing 16 is supported on the top surfaces of the four support members 31, and the turntable 28 is located below the support members 31, as shown in FIG. 5A, so that the casing 16 can be inserted without hindrance.

If the casing 16 is further pushed in from the position shown in FIG. 5A, the one end portion of the casing 16 abuts against the holding devive 35. By the agency of the holding device 35, the bank portion 20 of the retaining frame 17 is stopped, and the casing 16 and the retaining frame 17 are unlocked or disengaged from each other. If the casing 16, in this state, is pulled out, the retaining frame 17, held by the holding device 35, remains within the housing 12, accompanied with the video disc 15, while the casing 16 is emptied and taken out of the housing 12. Accordingly, the retaining frame 17 and the video disc 15 are supported by the four support members 31, as shown in FIG. 5B.

In the state shown in FIG. 5B, if one of the operating buttons 13 is depressed to give instructions for the start of reproducing operation, the turntable 28 first ascends to bear the video disc 15 thereon, and further rises to elevate the disc 15. Thus, the video disc 15 is brought to the position higher than the support members 31, and released from the support thereby, as shown in FIG. 5C. In the state of FIG. 5C, the turntable 28 rotates, the cartridge 33 moves to a predetermined position, and audio/video signals are picked up from the video disc 15 by the reproducing stylus.

When the reproducing operation is completed, the turntable 28 ceases to rotate. Then, the turntable 28 descends to the position shown in FIG. 5B, and the video disc 15 comes to be supported by the support members 31. If, in this state, the empty casing 16 is inserted through the insertion slot 14 into the housing 12 with its one end portion (at which the opening 19 is formed) forward until the one end portion of the casing 16 abuts against the bank portion 20 of the retaining frame 17, then the retaining frame 17 is locked to the casing 16, and the holding device 35 releases its hold of the retaining frame 17. If the casing 16 is pulled out, therefore, the video disc 15 is taken out of the housing 12 while it is housed together with the retaining frame 17 in the casing 16, as shown in FIG. 5A.

The internal mechanism in the housing 12 will now be described with reference to FIG. 4.

A second motor 34 as the second drive mechanism 38 is arranged with its rotating shaft 40 extending vertically. A pulley 41 is coaxially mounted on the upper end of the rotating shaft 40. A belt 42 is stretched between the turntable 28 and the pulley 41. Since the driving force of the motor 34 is transmitted to the turntable 28 through the belt 42, the dirving force may be transmitted even if the turntable 28 moves vertically.

Figure 8:
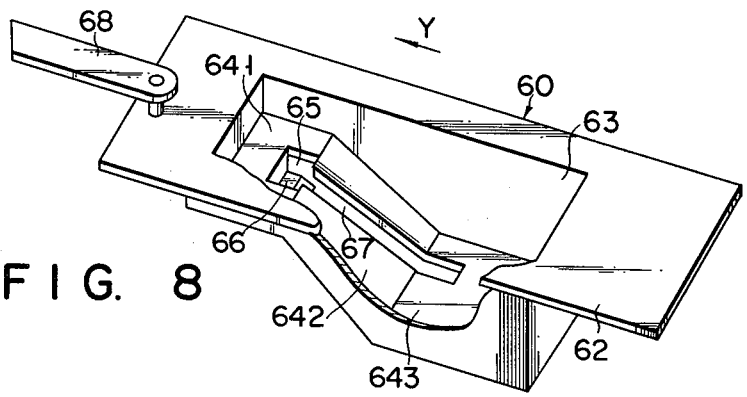
FIG. 8 is a partially cutaway, perspective view of a slider used for the first drive mechanism.

The first drive mechanism 37 regulating the vertical movement of the turntable 28 will be described in detail with reference to FIGS. 6 to 8.

The turntable 28 has a coaxial rotating shaft 55 fixed at its center. The lower end portion of the rotating shaft 55 is located below the chassis 27, extending therethrough. The middle portion of the rotating shaft 55 is rotatable provided in a receiver 56 mounted on the upper surface of the chassis 27 through a bearing 57. This bearing 57 allows movement of the rotating shaft 55 about the axis as well as movement along the axis (i.e., vertical movement). An annular groove 58 is formed at the lower end portion of the rotating shaft 55 and a bottom surface 59 of the rotating shaft 55 is formed by a smooth arcuated surface.

The position of the turntable 28 along the axis is defined by a slider 60. The slider 60 is slidably supported by a pair of slider supports 61 mounted at the lower surface of the chassis 27 along the direction shown by an arrow Y. The slider 60 shown in detail in FIG. 8 has a base plate 62. A recess 63 is formed at substantially the center of the base plate 62. The bottom surface of the recess 63 is constituted by a first flat bottom plate 641 having a predetermined depth from the level of the base plate 62, an inclined bottom plate 642 adjacent to the first flat bottom plate 641 increasing inclination downward in a opposite direction to the direction shown by the arrow Y, and a second flat bottom plate 643 adjacent to the inclined bottom plate 642 and having a depth, from the bottom surface of the first flat bottom plate 641, corresponding to the vertical movement of the turntable 28. These plates are arranged in the order named in the opposite direction to the direction shown by the arrow Y.

A large opening 65, the cross section of which is larger than that of the rotating shaft 55, is formed at that portion of the first flat bottom plate 641 which is adjacent to the inclined bottom plate 642. A supporting plate 66 which receives the bottom surface 59 of the rotating shaft 55 is mounted at the first flat bottom plate 641 below the opening 65. The supporting plate 66 is disposed parallel to the first flat bottom plate 641 and being spaced apart therefrom. The distal end of the supporting plate 66 is tapered in order to receive the bottom surface of the rotating shaft 55.

A groove 67 is formed along the direction shown by the arrow Y in the inclined plate 642 and a part of the second flat bottom plate 643 to be continuous with the opening 65. The width of the groove 58 is smaller than the diameter of the rotating shaft 55 and larger than the diameter of the annular groove 58. The rotating shaft 55 is supported on the slider 60 through engagement of the periphery of the groove 67 and the periphery of the annular groove 58 of the rotating shaft 55 described above.

Figure 9:
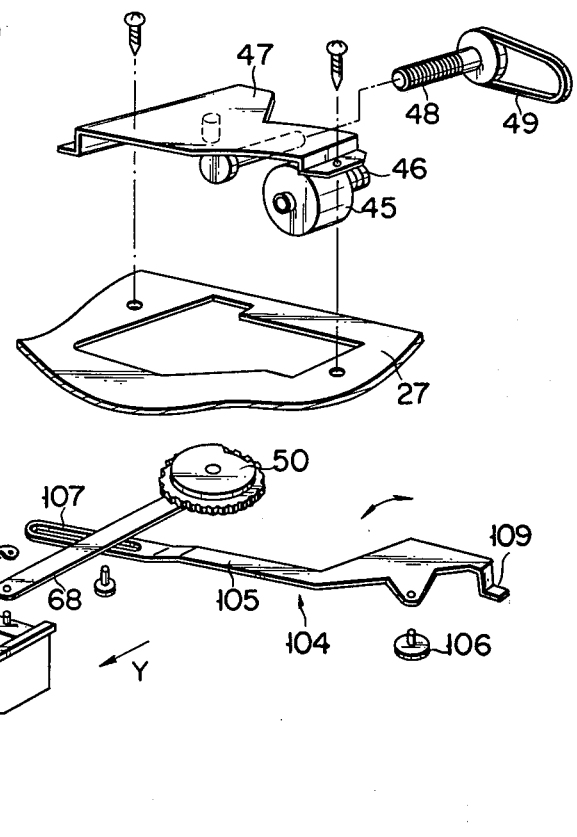
FIG. 9 is an exploded perspective view showing the first drive mechanism together with a control mechanism.

One end of a drive lever 68 is coupled to the rear part of the base plate 62 of the slider 60 along the direction indicated by arrow Y. The other end of the drive lever 68 is connected to a first motor 45. As shown in FIG. 9, the first motor 45 is secured to the chassis 27 through a mount plate 47 with a rotating shaft 46 extending horizontally. A worm 48 is rotatably mounted to this mount plate 47 parallel to the rotating shaft 46. A belt 49 is stretched between the worm 48 and the rotating shaft 46 so as to transmit the driving force of the first motor 45 to the worm 48 through the belt 49. A worm wheel 50 is pivotally mounted to the mount plate 47 to engage in mesh with the worm 48. The rotating axis of the worm wheel 50 vertically extends. The other end of the drive lever 68 is eccentrically and pivotally mounted to the under surface of the worm wheel 50. In the reproducing condition, the other end of the drive lever 68 is located to that portion of the worm wheel 50 which is positioned at opposite side of the slider 60 with the rotating axis of the worm wheel 50 therebetween. In the nonreproducing condition, the other end of the drive lever 68 is moved to the side of the slider 60 with the pivotal movement of the worm wheel 50, that is the slider 60 is moved along the direction shown by the arrow Y.

The mode of operation of the first drive mechanism 37 of the turntable 25 of the configuration as described above will be described hereinafter. The operation button 13 is depressed to start reproduction of information recorded on the video disc 15 from the nonreproducing condition shown in FIG. 6. Then, the first motor 45 gradually rotates the worm wheel 50 through 180°. With this pivotal movement, the drive lever 68 gradually moves the slider 60 in the direction opposed to the direction indicated by arrow Y. The periphery of the annular groove 58 on the rotating shaft 55 which has been engaged with the periphery of the groove 67 on the second flat bottom plate 643 now engages with the periphery of the groove 67 on the inclined bottom plate 642. The rotating shaft 55 of the turntable 28 is then lifted upward by the inclined surface of the inclined bottom plate 642. The video disc 15 is released from supporting by the supporting members 31 and placed on the turntable 28. When the periphery of the annular groove 58 on the rotating shaft 55 reaches the opening 65 of the first flat bottom plate 643, the periphery of the annular groove 58 is disengaged from the periphery of the groove 67 and the bottom surface 59 of the rotating shaft 55 is supported by the supporting plate 66. In this state, the video disc 15 is in its reproducing condition as shown in FIG. 7. The turntable 28 is driven by the second drive mechanism 38.

After reproduction, the second drive mechanism 38 stops driving the turntable 28. The first motor 45 of the first drive mechanism 37 rotates the worm wheel 50 through another 180° to move the drive lever 68 in the direction indicated by the arrow Y. Then, the slider 60 moves in the direction indicated by the arrow Y. The bottom surface 59 of the rotating shaft 55 is disengaged from the supporting plate 66 of the slider 60. The periphery of the annular groove 58 engages with the periphery of the groove 67 formed in the inclined bottom plate 642 of the slider 60. Thus, the rotating shaft 55 is lowered as the slider 60 moves. The video disc 15 which has been placed on the turntable 28 is now supported by the supporting members 31. When the periphery of the annular groove 58 on the rotating shaft 55 is engaged with the periphery of the groove 67 formed in the second flat bottom plate 643 of the slider 60, the turntable 28 stops its descending movement as shown in FIG. 6. In this condition, the first motor 45 stops driving the drive lever 68 to interrupt the reproducing operation.

The turntable 28 vertically moves in this manner. When the turntable 28 is located at the upper position, the video disc 15 is placed on the turntable 28 and the video disc player 10 is in the reproducing condition. On the other hand, when the turntable 28 is located at the lower position, the video disc 15 is not placed on the turntable 28 and the video disc player 10 is in the nonreproducing condition. In other words, the reproducing or nonreproducing condition of the video disc player 10 may be confirmed according to the position of the turntable 28 or the slider 60.

As shown in FIG. 4, a locking mechanism 69 is mounted to the cover 11 described above. This locking mechanism 69 and the slider 60 are coupled through an interlocking rod 70. In the reproducing condition of the player 10, the locking mechanism 69 prevents the cover 11 from opening or keeps the cover 11 closed. In the nonreproducing condition of the player 10, the locking mechanism 69 allows the cover 11 to open. In other words, the cover 11 is pivotal freely in this state.

Referring to FIG. 4 again, within the housing 12 is arranged an automatic loading mechanism 71 for automatically loading or unloading the casing 16. The automatic loading mechanism 71 has a pair of rollers 721 and 722 which are rotatable about vertical axes. The rollers 721 and 722 are located intermediate the guide rails 301 and 302 to be engageable with the outer side surfaces of the inserted casing 16, respectively. Worm wheels 731 and 732 are fixed to the upper ends of the rollers 721 and 722, respectively, to be coaxial therewith. Worms 741 and 742 are arranged to mesh with these worm wheels 731 and 732. The worms 741 and 742 are fixed to both ends of a common interlocking rod 75 for rotation therewith, respectively. The intercloking rod 75 extends in the direction perpendicular to the direction of loading of the casing which is indicated by arrow X. A pulley 76 is coaxially fixed to the extreme end of the interlocking rod 75. A third, reversible motor 77 is arranged below the roller 722 and fixed on the chassis 27, and has a rotating shaft extending parallel to the extending direction of the interlocking rod 75. A drive pulley (not shown) is coaxially mounted on the rotating shaft of the third motor 77. A belt 78 is stretched between the drive pulley and the pulley 76. The rollers 721 and 722 are rotated in the opposite directions by the third motor 77.

In the automatic loading mechanism 71 as described above, the casing 16 inserted through the insertion inlet 14 via the cover 11 reaches the positions intermediate the guide rails 301 and 302 where the rollers 721 and 722 are arranged. Then, detection switches (not shown) arranged at these positions are turned on. The third motor 77 thus drives the rollers 721 and 722 to automatically insert the casing 16 inside the player 10 without requiring help of the operator. When the release of the casing 16 from the holding device 35 is detected by another detection switch (not shown), the third motor 77 rotates in the opposite direction. The rollers 721 and 722 rotating in the opposite direction to that during insertion of the casing then automatically push out the casing 16 until the front end of the casing reaches the intermediate positions of the guide rails 301 and 302.

A pair of mutually opposing bent segments 801 and 802 extend outward from the substantially intermediate position and the rear position, respectively, of the first auxiliary chassis 321. A columnar guide rod 81 arranged between the bent segments 801 and 802 extends along the insertion direction indicated by arrow X. A cartridge guide 82 is mounted on the guide rod 81 to be slidable in the direction indicated by arrow X. One end of the cartridge 33 is fixed to the cartridge guide 82, while the other end thereof rotatably engages with the upper surface of the second auxiliary chassis 322 through an anti-friction bearing 83. Thus, the cartridge 33 is radially moved on the turntable 28 in the direction indicated by arrow X as the cartridge guide 82 moves.

The third drive mechanism 34 for driving the cartridge 33 will now be described in detail.

The third drive mechanism 34 has a fourth motor 85 which, in turn, has a rotating shaft 84 rotating about a vertical axis. The fourth motor 85 is located on that portion of the first auxiliary chassis 321 which is rear the insertion inlet 14. A worm 86 is mounted at that part of the auxiliary chassis 321 which is beyond the fourth motor 85 to be rotatable about a vertical axis. A belt 87 is wound around the rotating shaft 84 and the worm 86 so as to transmit the rotational force of the motor 85 to the worm 86 through the belt 87. A worm wheel 881 of large diameter is rotatably mounted on the auxiliary chassis 321 to engage with the worm 86, and has a rotating axis extending in the direction perpendicular to the direction indicated by arrow X. A first gear 882 of small diameter is coaxially mounted on the worm wheel 881. A second gear 89 of large diameter is rotatably mounted to the auxiliary chassis 321 to engage with the first gear 882 and has a rotating axis extending in the direction perpendicular to the direction indicated by arrow X. The second gear 89 is located at a fixed position. A first pulley 90 of small diameter is coaxially mounted to the second gear 89. With a reduction gear mechanism of this arrangement, the rotational force of the fourth motor 85 is transmitted to the first pulley 90.

An engaging pin 91 is fixed to the cartridge guide 82 to extend outward therefrom. A regulating plate 92 (FIGS. 10 to 13D) to be described later is movably mounted at the innermost portion of the first auxiliary chassis 321. A second pulley 93 is rotatably mounted to the upper end of this regulating plate 92 in the same manner as the first pulley 90. A steel wire 94 as a driver is stretched between the first and second pulleys 90 and 93. The ends of the wire 94 engage with the engaging pin 91. When the regulating plate 92 is in the first position at which the wire 94 is kept taut, the rotational force of the fourth motor 85 is transmitted to the cartridge guide 82. As the rotating shaft 84 of the fourth motor 85 rotates, the cartridge 33 moves in the direction opposite to the direction indicated by arrow X. When the regulating plate 92 is in the second position at which the wire 94 is not taut, the rotational force of the fourth motor 85 is not transmitted to the cartridge guide 82. Therefore, even if the rotating shaft 84 of the motor 85 rotates, the cartridge 33 is not moved and the movement of the pickup arm 33 is not transmitted to the rotating shaft 84 of the motor 85. Thus, the cartridge 33 is free to move.

A transmission mechanism 95 and a cartridge locking mechanism 100 which are the characteristic features of the present invention will now be described with reference to FIGS. 9 to 13D.

Figure 10:
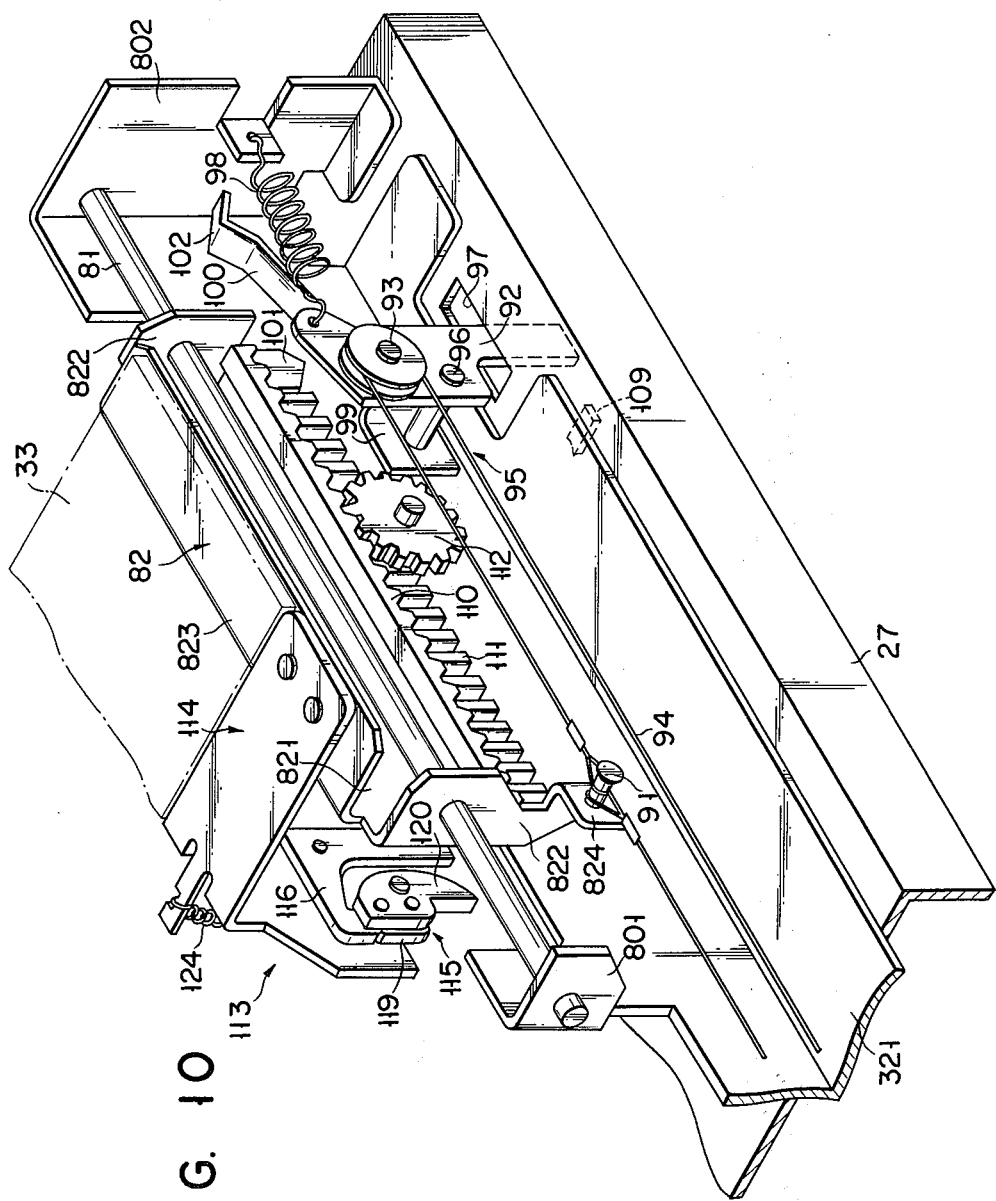
FIG. 10 is a perspective view of a cartridge engaging device in the reproducing condition.
Figure 11:
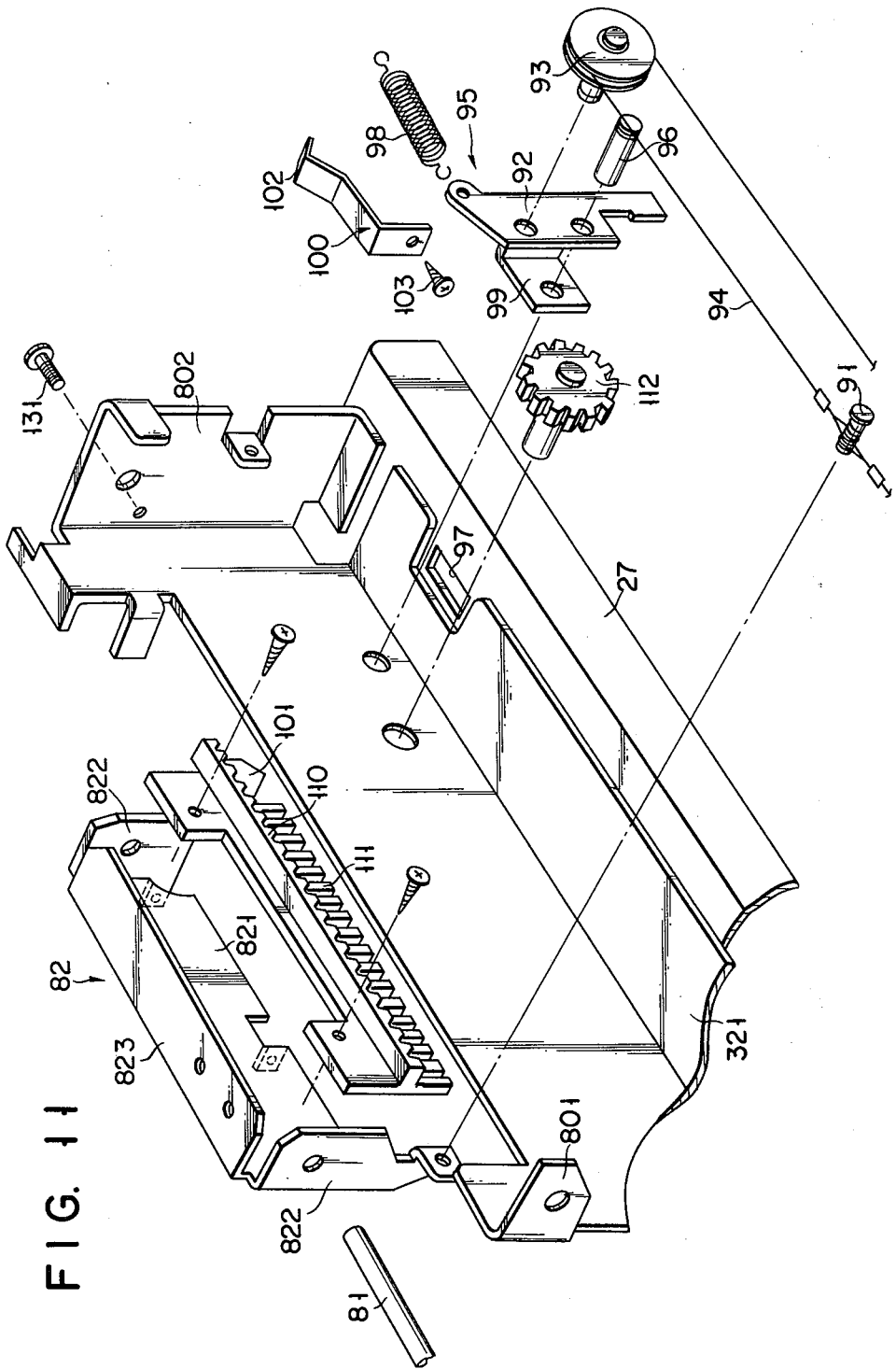
FIG. 11 is an exploded perspective view showing the cartridge engaging device in the reproducing condition.

The transmission mechanism 95 includes the regulating plate 92 described above. The regulating plate 92 is rotatably mounted, at its intermediate position, on the first auxiliary chassis 321 through a rotating shaft 96 as shown in FIGS. 10 and 11. A through hole 97 is formed at that part of the chassis 27 which is located below the regulating plate 92. The lower end of the regulating plate 92 extends downward beyond the rear surface of the chassis 27 through the through hole 97.

Figure 12:
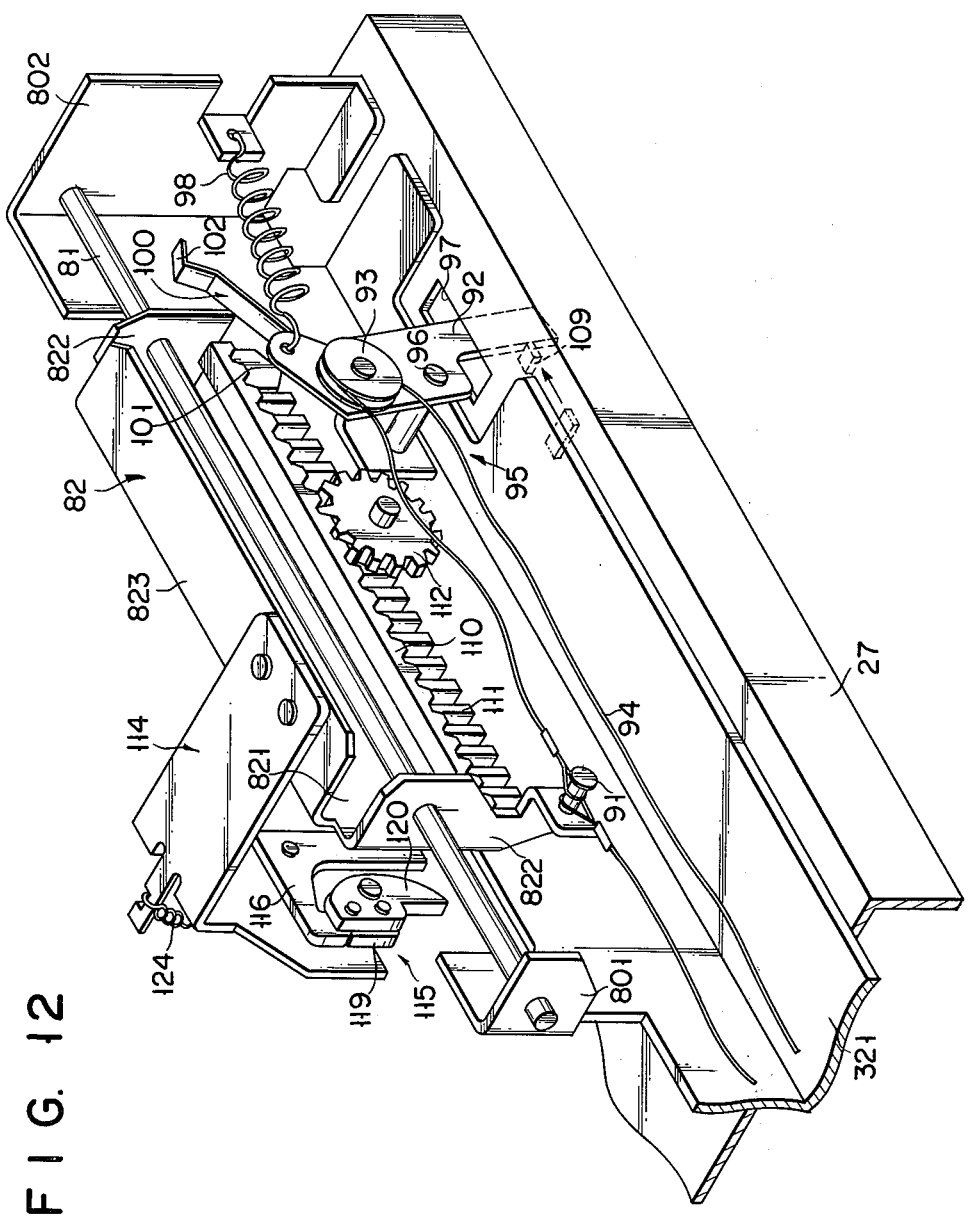
FIG. 12 is a perspective view showing the cartridge engaging device in the nonreproducing condition.
Figure 13A:
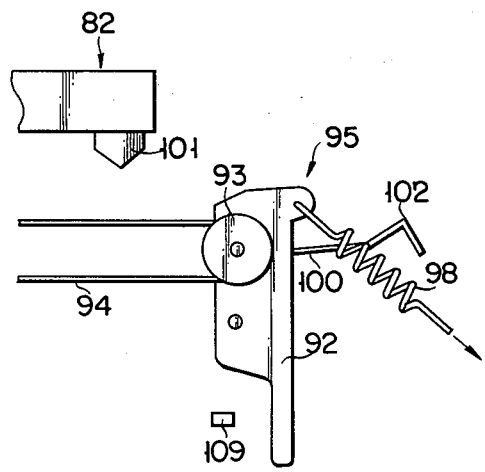
FIGS. 13A to 13D are side views for explaining the mode of operation of the cartridge engaging device.
Figure 13B:
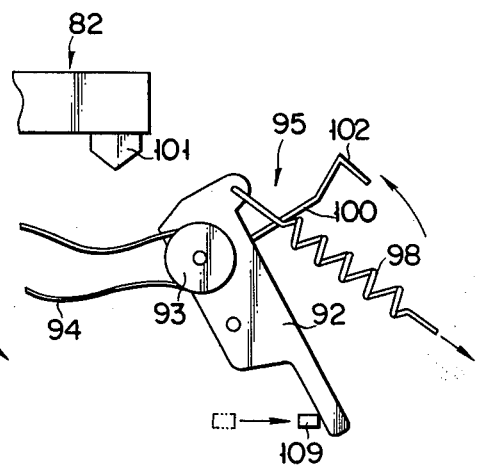

A coil spring 98 is provided between the upper end of the regulating plate 92 and the bent segment 802 of the first auxiliary chassis 321. The coil spring 98 biases the regulating plate 92 from the second position (as shown in FIGS. 12 and 13B) to the first position (FIGS. 10 and 13A). When no external force acts thereon, the regulating plate 92 is elastically held in its first position by the biasing force of the coil spring 98.

Figure 13C:
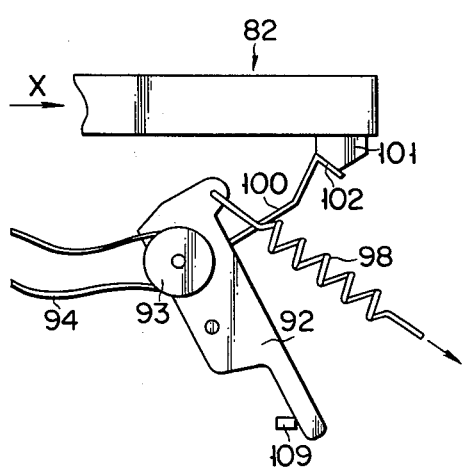
Figure 13D:
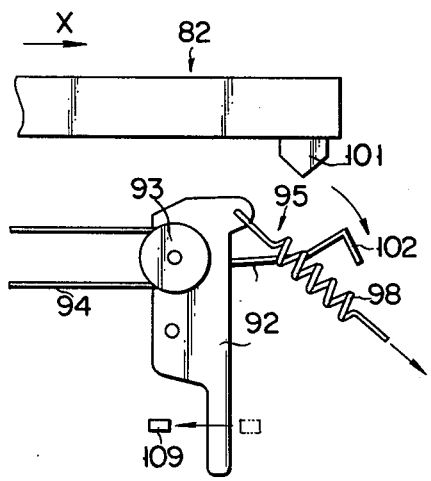

A support segmnet 99 projecting toward the first auxiliary chassis 321 is fixed to the inner side surface of the regulating plate 92 or the side surface of the regulating plate 92 facing the first auxiliary chassis 321. The cartridge locking mechanism or locking segment 100 is arranged to face with the bent segment 802. A locking portion 102 engageable with a projection 101 which is formed on the cartridge guide 82, to be described later, is mounted at the distal end of the locking segment 100. The locking segment 100 is formed of a leaf spring fixed to the supporting segment 99 with a screw 103. The locking portion 102 projects upward. When the regulating plate 92 is in the first position, the locking portion 102 is brought to the third position at which the locking portion 102 does not engage with the projection 101, as shown in FIGS. 13A and 13D. On the other hand, when the regulating plate 92 is at its second position, the locking portion 102 is brought to the fourth position at which the locking portion 102 does not engage with the projection 101, as shown in FIGS. 13B and 13C. In other words, when the rotational force of the fourth motor 85 can be transmitted to the cartridge guide 82, the locking portion 102 does not lock the cartridge guide 82. On the other hand, when the cartridge guide 82 is free to move, the locking portion 102 brings the guide 82 to the engageable position.

The transmission mechanism 95 has a control mechanism 104 for controlling the pivoting position of the regulating plate 92, which is mounted on the under surface of the chassis 27 as shown in FIG. 9. This control mechanism 104 controls the movement of the regulating plate 92 to the first or second position according to the reproducing or nonreproducing condition of the video disc player 10. The control mechanism 104 has a control lever 105 which is pivotally mounted on the under surface of the chassis 27. The control lever 105 is pivotally mounted, at its intermediate position, on the under surface of the chassis 27 through a pivot pin 106. An elongate hole 107 is axially formed at one end of the control lever 105. One end of the control lever 105 crosses the drive lever 68 described above and is engaged with the driver lever 68 through an engaging pin 108 extending through the elongate hole 107. The other end of the control lever 105 extends so that it may be brought into contact with that side surface of the lower end of the regulating plate 92 which is facing to the insertion inlet 14. This other end of the control lever 105 is defined as an engaging portion 109.

When the first drive mechanism 37 moves the slider 60 to descend the turntable 28 toward the lower position, the engaging portion 109 regulates the position of the regulating plate 92 to the second position through the engagement of the drive lever 68 and the control lever 105. When the first drive mechanism 37 moves the slider 60 to ascend the turntable 28 toward the upper position, the engaging portion 109 regulates the position of the regulating plate 92 to the first position. In other words, when the player is in the reproducing condition, the regulating plate 92 is brought to the first position, and when the player is in the nonreproducing condition, the regulating plate 92 is brought to the second position.

Figure 14:
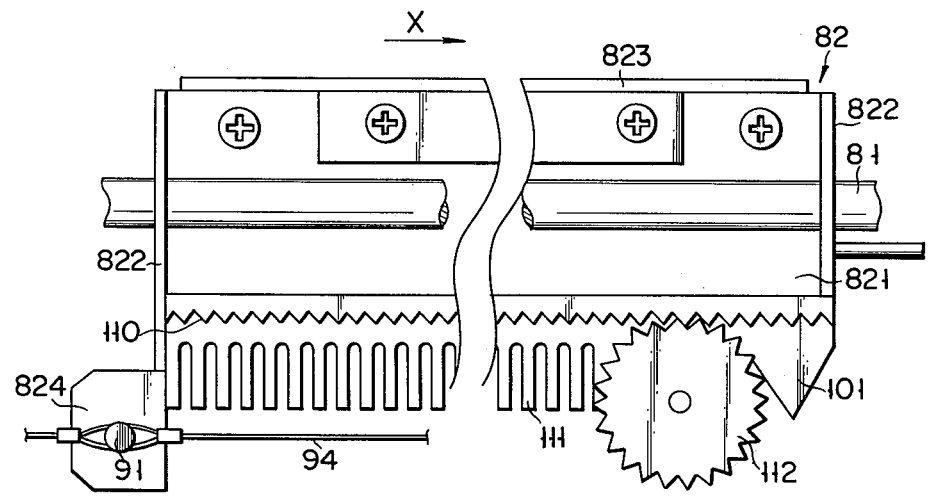
FIG. 14 is a side view showing a cartridge guide.

As shown in FIG. 14, the cartridge guide 82 including a main body 821 extending in the direction indicated by arrow X, side plates 822 bent from sides of the main body 321, and a top plate 823 bent from the upper side of the main body 821. These parts of the cartridge guide 82 are formed integrally with each other from a synthetic resin. A rack portion 110 and a comb portion 111 are mounted in a stepped manner on the outer side surface of the main body 821 to extend in the direction indicated by arrow X. A detection gear 112 for correction control engages with the rack portion 110 and is pivotally supported on the first auxiliary chassis 321. The shaft of the detection gear 112 is coupled to a variable resistor (not shown), the resistance of which varies in accordance with the rotational angle of the detection gear 112. On the basis of the resistance of the variable resistor, the position of the cartridge 33 is detected. In accordance with a detection signal thus obtained, the rotational frequency of the disc is correctly controlled in accordance with the position of the stylus along the radial direction of the disc.

The comb portion 111 has a number of parallel projections arranged at equal intervals. The projection 101 described above is arranged at the downstream of the comb portion 111 as viewed in the direction indicated by arrow X. The projection 101 is in the form of an inverted triangle. A cartridge feed amount detection mechanism (not shown) is fixed to the first auxiliary chassis 321 with the comb portion 111 interposed therebetween. The cartridge feed amount detection mechanism detects the number of projections passed thereby to detect the speed and amount of movement of the cartridge 33.

The cartridge guide 82 is slidably supported through engagement of the guide rod 81 with through holes formed in the side plates 822. The engaging pin 91 is fixed to a support segment 824 mounted on the side plate 822 at the side of the insertion inlet 14.

The mode of operation of the transmission mechanism 95 and the cartridge locking mechanism 100 will now be described with reference to the driving operations of the cartridge 33 and the turntable 28.

The reproducing operation of the player 10 is instructed in the condition wherein the disc 15 is mounted in the housing 12. The turntable 28 is moved upward through the first drive mechanism 37. The disc 15 is placed on the turntable 28 which is rotated through the second drive mechanism 38. The disc 15 is thus rotated. With the movement of the drive lever 68 for moving the turntable 28 upward, the control lever 105 pivots clockwise (FIG. 9) about the pivot pin 106. The engaging portion 108 of the control lever 105 is moved from the second position shown in FIG. 13C to the first position shown in FIG. 13D. The engaging portion 109 no longer contacts the lower part of the regulating plate 92, and the regulating plate 92 pivots clockwise by the biasing force of the coil spring 98. The steel wire 94 is then kept taut between the first and second pulleys 90 and 93. Simultaneously, the locking portion 102 of the locking segment 100 is moved from the fourth position to the third position. The projection 101 of the cartridge guide 82 no longer engages with the locking portion 102. When the turntable 28 is thus located at the upper position, the driving force of the third drive mechanism 34 is transmitted to the cartridge guide 82 and the cartridge guide 82 is released from the condition where the guide 82 is held in its position.

Then, the fourth motor 85 of the third drive mechanism 34 is started to drive, and the cartridge 33 gradually moves from the start position shown in FIG. 13D in the direction opposite to the direction indicated by arrow X. When the stylus mounted on the cartridge 33 through a cantilever reaches the outer periphery of the recording portion on the disc 15, the stylus is lowered onto the surface of the disc 15 through a moving mechanism (not shown). Thus, the signals recorded on the disc 15 are reproduced.

The stylus of the cartridge 33 is slidably moved on the surface of the disc 15 through the third drive mechanism 34. When the stylus reaches the inner periphery of the recording portion on the disc 15, the stylus moves upward and is mounted within the cartridge 33. In this state, the second motor 38 is stopped rotating the turntable 28. The turntable 28 is moved downward through the first drive mechanism 37, and the player 10 is placed in the nonreproducing condition. Then, the disc 15 may be withdrawn from the housing 12.

When the drive lever 68 for lowering the turntable 28 moves in this nonreproducing condition of the player 10, the control lever 105 of the control mechanism 104 pivots counterclockwise (FIG. 9) about the pivot pin 106. The engaging portion 109 of the control lever 105 is thus moved from the first portion shown in FIG. 13A to the second position shown in FIG. 13B. Thus, the engaging portion 109 is brought into contact with the lower part of the regulating plate 92, and the regulating plate 92 pivots counterclockwise against the biasing force of the coil spring 98 to the second position. The steel wire 94 is not kept taut between the first and second pulleys 90 and 93. Simultaneously, the locking portion 102 of the locking segment 100 is moved from the third position to the fourth position. The projection 101 of the cartridge guide 82 is brought to the position where it is engageable with the locking portion 102. When the turntable 28 is located at the lower position, the driving force of the third drive mechanism 34 is no longer transmitted to the cartridge guide 82, and the cartridge 82 is made free to move. The guide 82 is held in the condition wherein the projection 101 is engaged with the locking portion 102.

The empty casing 16 is then inserted into the housing 12 through the insertion inlet 14 in order to take out the disc 15 in this condition. The empty casing 16 manually inserted to the intermediate position of the housing 12 is automatically inserted to the innermost position by the automatic loading mechanism 71. The cartridge 33 after reproduction is located at the inner periphery of the recording portion on the disc 15 as it is free to move. Upon the insertion of the empty casing 16, the front end of the casing 16 is brought into contact with a pawl mechanism 113 to be described later which is disposed at the end of the cartridge guide 82 at the side of the insertion inlet 14. Upon insertion of the casing 16, the cartridge 33 is restored to the innermost portion of the housing 12 in the direction indicated by arrow X. The restoring operation of the cartridge 33 is performed smoothly since the cartridge guide 82 is in the condition free to move. Furthermore, the cartridge 33 does not apply a big load on the third motor 77 of the automatic loading mechanism 71. Since the fourth motor 85 of the third drive mechanism 34 is not forcibly rotated, the insertion resistance of the casing 16 is minimized.

As the cartridge 33 moves to the innermost portion of the housing 12, the right inclined side of the projection 101 of the cartridge guide 82 is brought into contact with the left inclined side of the locking portion 102 of the locking segment 100 in the direction indicated by arrow X to press the locking portion 102 downward against the elasticity of the locking segment 100. When the cartridge 33 reaches the innermost portion of the housing 12 or the start position, the right inclined side of the locking portion 102 is brought into contact with the left inclined side of the projection 101 as shown in FIG. 13C and the cartridge 82 stops moving. When the cartridge is brought to the start position in this manner, the cartridge 82 is elastically held by the locking portion 102 of the locking segment 100. For this reason, the bouncing of the cartridge guide 82 upon restoring movement is prevented and the cartridge guide 82 is securely held at this start position. In the condition other than the reproducing condition or in the condition wherein the turntable 28 is located at the lower position, the cartridge guide 82 is kept held. Therefore, a special mechanism for securely holding the cartridge 33 is not required when the player 10 is to be transferred.

The casing 16 may be manually inserted completely by the operator instead of being automatically inserted by the automatic loading mechanism 71.

The cartridge guide 82 may be moved to the start position through the transmission mechanism 95 described above through the engagement of the front end of the casing 16 and the pawl mechanism 113 of the cartridge guide 82. However, the casing 16 must be inserted inside the housing 12 after the cartridge guide 82 is restored to the start position and the cartridge guide 82 must reach the holding device 35 through the space below the cartridge 33. When the cartridge guide 82 is not at the start position, the pawl mechanism 113 is engaged with the casing 16. When the cartridge guide 82 is restored to the start position, the pawl mechanism 113 no longer engages with the casing 16, as shown in FIGS. 15 to 17D.

The pawl mechanism 113 includes a mount plate 114 screwed to that part of the top 823 of the cartridge guide 82 which is located at the side of the insertion inlet 14. The mount plate 114 is formed as an L-shape, has a horizontal segment 114a mounted to the top 823, a pawl assembly 115 to be described later, and a vertical segment 114b on which a locking lever 116 is pivotally mounted. A first pivot hole 117 of circular shape is formed in the vertical segment 114b and first and second arc-shaped grooves 118a and 118b concentric with the first pivot hole 117 are formed in the vertical segment 114b so as not to overlap each other. The circumferential lengths of the arc-shaped grooves 118a and 118b are defined so that ends thereof form an angle of about 90° with respect ot the pivot hole 117.

The pawl assembly 115 has a locking plate 119 and a contact plate 120 which are fixed to each other. Through holes 119a and 120a are formed at those parts of the locking plate 119 and the contact plate 120 which correspond to the first pivot hole 117. The locking plate 119 and the contact plate 120 are pivotally mounted on the mount plate 114 through a pivot pin 121 which is, in turn, mounted to the mount plate 114 through the first pivot hole 117 and the through holes 119a and 120a. A first regulating pin 122 inserted in the first arc-shaped groove 118a is fixed to the locking plate 119 with ends of the pin 122 extending outward therefrom. A through hole 120b for receiving the first regulating pin 122 is formed in that part of the contact plate 120 which corresponds to the first regulating pin 122. Through holes 119b and 120c for receiving a second regulating pin 123 are also formed in the locking plate 119 and the contact plate 120. The through holes 119b and 120c are formed at positions such that the locking plate 119 and the contact plate 120 may pivot through 90° with the distal end of the second regulating pin 123 being inserted within the second arc-chaped groove 118b.

The locking plate 119 has a locking groove 119c, at its upper end, which is engageable with a locking portion 116a of the locking lever 116 to be described later. The contact plate 120 has a contact portion 120d, at its lower end, which may be brought into contact with the front end of the inserted casing 16. A coil spring 124 is mounted between that end portion of the first regulating pin 122 which projects through the mount plate 114 and the mount plate 114. The coil spring 124 biases the pawl assembly 115 in the clockwise direction. Through the biasing force of the coil spring 124, the first and second regulating pins 122 and 123 of the pawl assembly 115 are brought into contact with the ends of the first and second arc-shaped grooves 188a and 118b at the downstream (clockwise direction) when no external force is acting thereon. In this condition, the contact portion 120d of the contact plate 120 is on the path of the insertion movement of the casing 16 to be brought into contact with the front end of the casing 16.

The locking lever 116 described above for prohibiting the counterclockwise pivotal movement of the pawl assembly 115 is pivotally mounted on the vertical segment 114b of the mount plate 114. This locking lever 116 is formed as an inverted, substantially L-shape, and has a vertical arm 116b and a horizontal arm 116c integrally. The locking lever 116 is pivotally mounted, at its bent portion, on the vertical segment 114b through a pin 125. The locking portion 116a described above is formed at the distal end of the horizontal arm 116c. An engaging hole 126 is formed at the lower end of the vertical arm 116b. A front part 127b of a regulating rod 127 for regulating the pivoting position of the locking lever 116 is inserted in this engaging hole 126. This regulating rod 127 is of L-shape, and has a main body rod 127a extending in the direction indicated by arrow X, and the front part 127b bent at right angle from the front end of the main body rod 127a.

Figure 16:
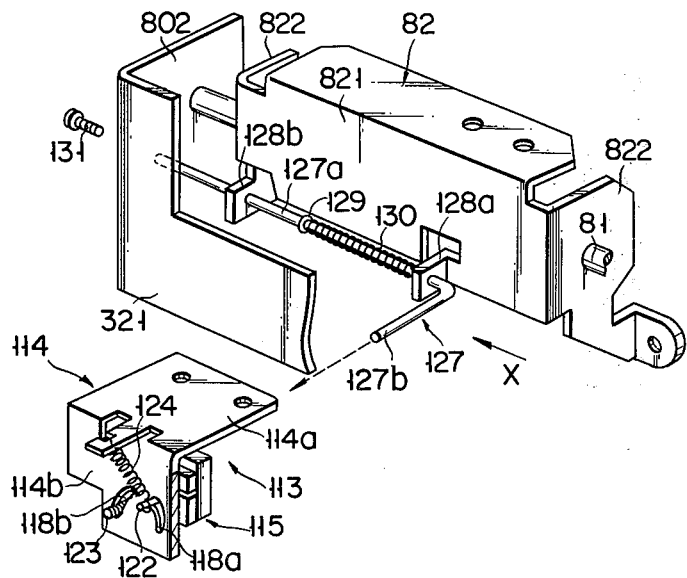
FIG. 16 is a perspective view showing the mounting condition of a regulating rod.
Figure 15:
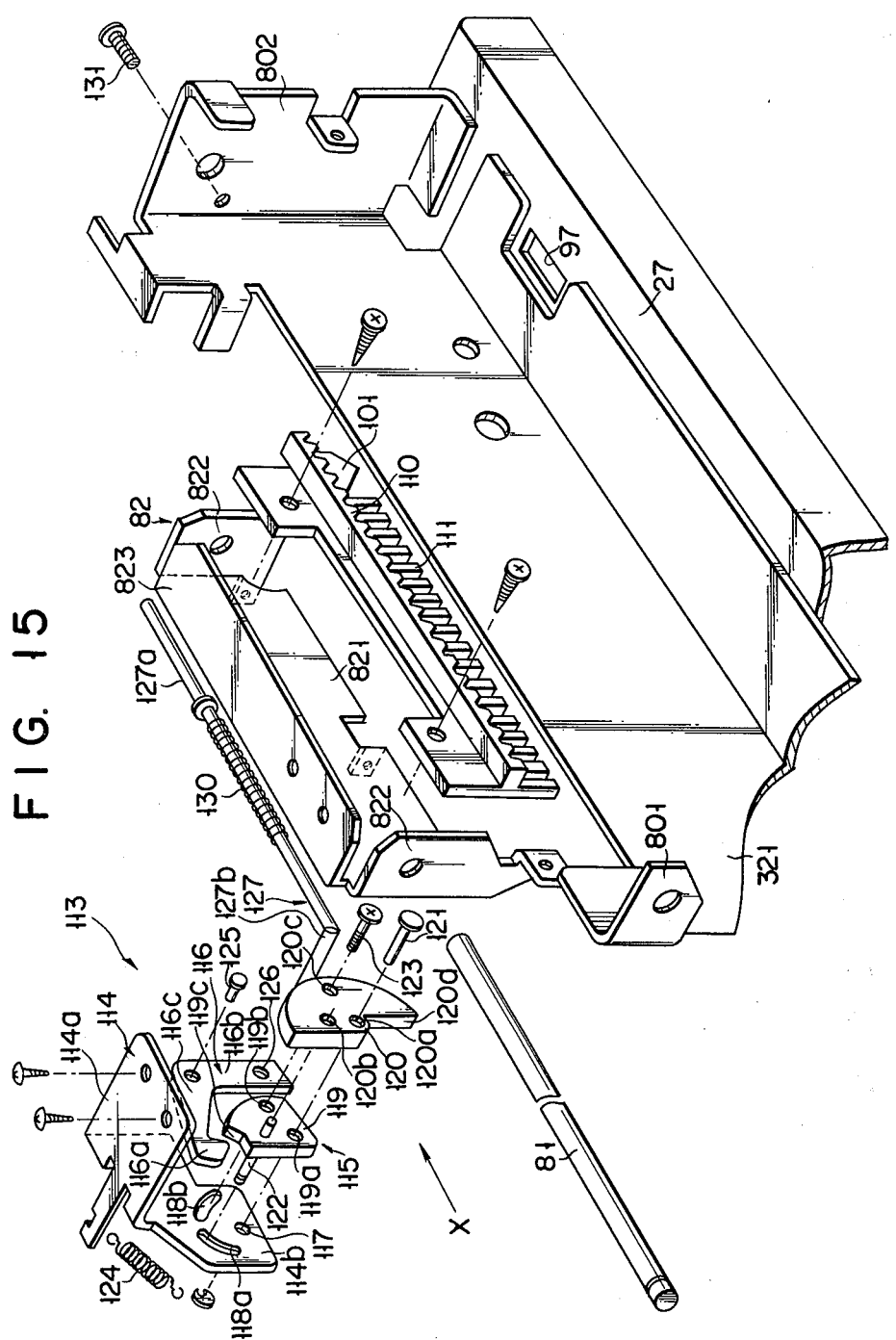
FIG. 15 is an exploded perspective view showing a pawl mechanism.
Figure 17A:
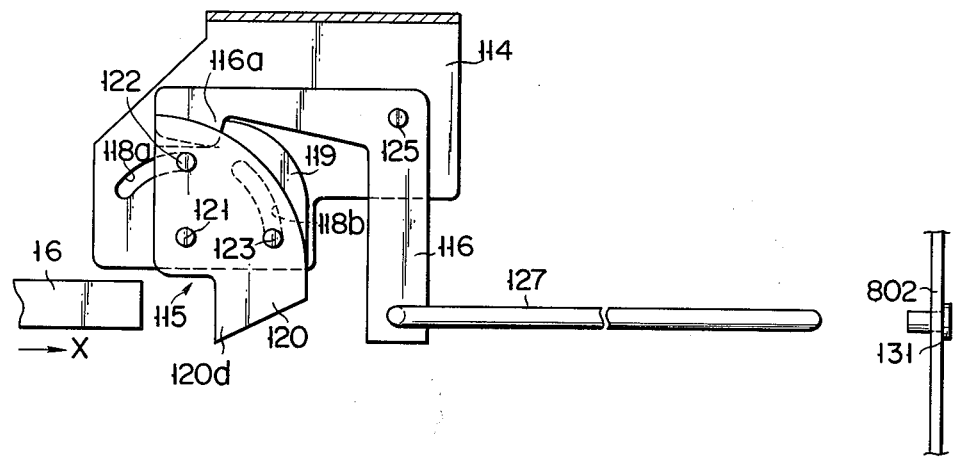
Figure 17B:
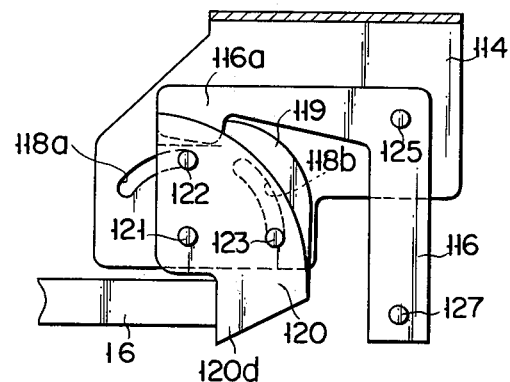

The regulating rod 127 is supported at the inner surface of the main body 821 of the cartridge guide 82 and between a pair of supporting segments 128a and 128b to be movable in the direction indicated by arrow X, as shown in FIG. 16. The pair of supporting segments 128a and 128b are attached to the main body 821. A flange-shaped stopper 129 is fitted to that part of the main body rod 127a which is located between the supporting segments 128a and 128b. A coil spring 130 is wound around that part of the main body rod 127a which is located between the stopper 129 and the supporting segment 128a at the side of the insertion inlet 14. The coil spring 130 biases the regulating rod 127 in the direction indicated by arrow X. When no external force is acting on the regulating rod, the regulating rod 127 is brought, by the biasing force of the coil spring 130, to a position where the locking lever 116 is engaged with the locking plate 119, as shown in FIG. 17A. The counterclockwise pivotal movement of the pawl assembly 115 is prevented by the engagement of the locking lever 116 with the locking plate 119, as shown in FIG. 17B. The rear end of the regulating rod 127 extends backward beyond the rear end of the cartridge guide 82, in the direction indicated by arrow X. An adjusting screw 131 is screwed to that part of the second bent segment 802 which is opposing the rear end of the regulating rod 127 so as to be movable in the direction indicated by arrow X. As the cartridge guide 82 moves in the direction indicated by arrow X, the rear end of the reguating rod 127 is brought into contact with the adjusting screw 131, and the movement of the regulating rod 127 is stopped. As the cartridge guide 82 further moves toward the start position, the coil spring 130 is compressed since the regulating rod 127 is stopped. Simultaneously, the locking lever 116 pivots clockwise, as shown in FIG. 17C, about the pin 125, and the locking lever 116 is disengaged from the pawl assembly 115.

The mode of operation of the pawl mechanism 113 of the arrangement as described above will now be described below.

After reproduction, no external force is acting on the regulating rod 127. Therefore, the regulating rod 127 is biased in the direction indicated by arrow X by the biasing force of the coil spring 130. The locking lever 116 engages with the locking plate 119 of the pawl assembly 115 so as to prevent the pawl assembly 115 from rotating. When the empty casing 16 is inserted in this condition as shown in FIG. 17A, the front end of the casing 16 is brought into contact with the contact portion 120d of the contact plate 120 of the pawl assembly 115, as shown in FIG. 17B. Since the rotation of the pawl assembly 115 is prevented as described above, the cartridge guide 82 is restored to the start position in the direction indicated by arrow X upon insertion of the casing 16. Immediately before the cartridge guide 82 is restored to the start position, the rear end of the regulating rod 117 contacts with the adjusting screw 131. When the cartridge guide 82 is further restored to the start position, the locking lever 116 is disengaged from the locking plate 119 as shown in FIG. 17D. The pawl assembly 115 is thus made rotatable. Then, the cartridge guide 82 stops at the start position. When the casing 16 is further inserted, the contact plate 120 pivots counterclockwise against the biasing force of the coil spring 124. Thus, the casing 16 passes below the pickup arm 33 to be engaged with the holding device 35, as shown FIG. 17C.

When the cartridge guide 82 starts moving from the start position in the direction opposite to the direction indicated by arrow X for starting reproduction again, the regulating rod 127 is biased by the biasing force of the coil spring 130 to a position where the locking lever 116 engages with the locking plate 119. The pivotal movement of the pawl assembly 115 is then prohibited.

When the cartridge guide 82 is located at a position other than the start position, the casing 16 is capable of moving the cartridge 33 through the pawl mechanism 113. On the other hand, when the cartridge guide 82 is located at the start position, the casing 16 can reach the holding device 35 through the space below the cartridge 33.

What we claim is:

1. A disc reproducing apparatus into which a disc is inserted by insertion of a casing housing the disc therein and from which the disc is removed by insertion of an empty casing thereinto,
said reproducing apparatus comprising:
a turntable which is vertically movable;
turntable driving means for moving said turntable to an upper position in a reproducing condition and for moving said turntable to a lower position in a nonreproducing condition;
a cartridge which has a stylus for picking up signals recorded on said disc in the reproducing condition and which is movable between a reproduction start position and a reproduction end position;
cartridge driving means, with a motor, for driving said cartridge by driving force of said motor; and
holding means for holding said cartridge at the start position in the nonreproducing condition,
said cartridge driving mans including a clutch means which transmits the driving force of said motor to said cartridge when said turntable is located at the upper position, and which does not transmit the driving force of said motor to said cartridge to render said cartridge free to move when said turntable is positioned at the lower position;
said cartridge being restored to the start position through engagement of the empty casing with said cartridge upon insertion of the empty casing; and
said holding means including an engaging mechanism which engages with said cartridge at the start position to securely hold said cartridge in position when said turntable is located at the lower position and which does not engage with said cartridge to render said cartridge to be released from the condition where the cartridge is held in its position when said turntable is located at the upper position.

2. The disc reproducing apparatus according to claim 1, wherein said cartridge is provided with a pawl mechanism which is engageable with the casing when said turntable is located at the lower position and said cartridge is located at a position other than the start position, and which is disengageable with the casing when said turntable is lacated at the lower position and said cartridge is located at the start position.

3. The disc reproducing apparatus according to claim 1, wherein said clutch mechanism includes:
a first pulley which is positioned at a fixed position and which is rotated by said motor;
a regulating plate which is movable between a first position and a second position;

a second pulley rotatably mounted on said regulating plate;

an endless transmission member which is stretched between said first and second pulleys and part of which is fixed to said cartridge; and a control mechanism which moves said regulating plate to the first position at which said transmission member is kept tense to allow the movement of said cartridge through said transmission member upon rotation of said first pulley, when said turntable is located at the upper position, and which moves said regulating plate to the second position at which said transmission member is not tense to prohibit transmission of a rotational force of said first pulley to said cartridge through said transmission member, when said turntable is located at the lower position; and said engaging mechanism includes:

a locking plate which is fixed to said regulating plate, which is located at a third position to be disengaged from said cartridge when said regulating plate is located at the first position, and which is located at a fourth position to be engageable with said cartridge when said regulating plate is at the second position, said locking plate engaging with said cartridge to prevent said cartridge from moving from the start position to the end position when said turntable is located at the lower position and said cartridge is located at the start position.

4. The disc reproducing apparatus according to cliam 3, wherein said locking plate comprises a leaf spring.

5. The disc reproducing apparatus according to claim 3, wherein said locking plate extends along a direction from the end position toward the start position.

6. The disc reproducing apparatus according to claim 5, wherein said locking plate has a locking portion of a mountain-like shape at an extending end thereof, and said cartridge has a projection engageable with said locking portion.

7. The disc reproducing apparatus according to claim 3, wherein said control mechanism includes:

a biasing member for biasing said regulating plate in a direction from the second position toward the first position; and a control lever which is brought to a position to be disengaged from said regulating plate to elastically hold said regulating plate at the first position by a biasing force of said biasing member when said turntable is located at the upper position, and which is brought to a position to be engaged with said regulating plate to hold said regulating plate at the second position against the biasing force of said biasing member when said turntable is located at the lower position.

* * * * *